United States Patent
Lutnick et al.

(10) Patent No.: US 10,824,966 B2
(45) Date of Patent: *Nov. 3, 2020

(54) RECEIVING A REQUEST TO RESERVE A SERVICE

(71) Applicant: CFPH, LLC, New York, NY (US)

(72) Inventors: Howard W. Lutnick, New York, NY (US); Dean P. Alderucci, Westport, CT (US)

(73) Assignee: CFPH, LLC, New York, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/164,118

(22) Filed: Oct. 18, 2018

(65) Prior Publication Data
US 2019/0122147 A1    Apr. 25, 2019

Related U.S. Application Data

(63) Continuation of application No. 12/906,643, filed on Oct. 18, 2010, now Pat. No. 10,108,908, which is a
(Continued)

(51) Int. Cl.
*G06Q 10/02* (2012.01)
*G06Q 30/06* (2012.01)
(Continued)

(52) U.S. Cl.
CPC ......... *G06Q 10/02* (2013.01); *G06Q 30/0633* (2013.01); *G06Q 50/12* (2013.01); *G06Q 99/00* (2013.01)

(58) Field of Classification Search
CPC .... G06Q 10/02; G06Q 30/0633; G06Q 50/12; G06Q 99/00
(Continued)

(56) References Cited

U.S. PATENT DOCUMENTS

| | | |
|---|---|---|
| 6,789,011 B2 | 9/2004 | Baiada et al. |
| 6,842,719 B1 | 1/2005 | Fitzpatrick et al. |
| | (Continued) | |

FOREIGN PATENT DOCUMENTS

| | | |
|---|---|---|
| JP | 2001-297023 | 10/2001 |
| JP | 2001-350999 | 12/2001 |
| | (Continued) | |

OTHER PUBLICATIONS

International Search Report and Written Opinion for International Application No. PCT/US08/53309, dated Jun. 5, 2008 (10 pages).
(Continued)

*Primary Examiner* — Vanel Frenel

(57) ABSTRACT

Methods and corresponding system are provided herewith that, in at least one embodiment, include the act or acts of: receiving a request to reserve a service that is provided by a restaurant. The request to reserve is for a particular time and a particular date and the service comprises at least one of: (i) preparing a consumable good that is consumed at the restaurant's location; (ii) preparing a consumable good that is received at the restaurant's location; or (iii) preparing a consumable good that is delivered to a location external to the restaurant's location. The methods and system also include comparing the particular time requested with a schedule associated with the restaurant. The schedule comprises a list of times that are available for reservation. The methods and system also include determining an availability of the request to reserve; and outputting an indicia that the request to reserve the service has been accepted or denied.

20 Claims, 2 Drawing Sheets

FIG. 1

Related U.S. Application Data continuation of application No. 11/681,663, filed on Mar. 2, 2007, now Pat. No. 7,818,191.

(51) Int. Cl.
*G06Q 50/12* (2012.01)
*G06Q 99/00* (2006.01)

(58) Field of Classification Search
USPC ...... 705/5, 6, 26.1, 15, 37; 340/540, 825.29; 235/379; 701/300
See application file for complete search history.

(56) References Cited

U.S. PATENT DOCUMENTS

| | | |
|---|---|---|
| 6,865,261 B1 | 3/2005 | Rao et al. |
| 7,003,485 B1 | 2/2006 | Young |
| 7,069,228 B1 | 6/2006 | Rose et al. |
| 11,681,663 | 3/2007 | Lutnick et al. |
| 11,681,666 | 3/2007 | Lutnick et al. |
| 11,681,675 | 3/2007 | Lutnick et al. |
| 7,778,853 B2 | 8/2010 | Sussman et al. |
| 7,818,191 B2 | 10/2010 | Lutnick et al. |
| 12,906,643 | 10/2010 | Lutnick et al. |
| 7,953,632 B2 | 5/2011 | Salerno |
| 8,224,700 B2 | 7/2012 | Silver |
| 8,463,649 B2 | 6/2013 | Lutnick et al. |
| 8,825,529 B2 | 9/2014 | Lutnick et al. |
| 9,934,471 B2 | 4/2018 | Lutnick et al. |
| 10,108,908 B2 | 10/2018 | Lutnick et al. |
| 2002/0072940 A1 | 6/2002 | Keough |
| 2003/0065565 A1 | 4/2003 | Wagner et al. |
| 2003/0078793 A1 | 4/2003 | Toth |
| 2004/0215517 A1 | 10/2004 | Chen et al. |
| 2005/0267787 A1 | 12/2005 | Rose et al. |
| 2006/0218043 A1 | 9/2006 | Rosenzweig et al. |
| 2007/0077944 A1 | 4/2007 | Bellenger et al. |
| 2007/0088624 A1 | 4/2007 | Vaughn et al. |
| 2008/0215382 A1 | 9/2008 | Lutnick et al. |
| 2008/0215446 A1 | 9/2008 | Lutnick et al. |
| 2008/0215447 A1 | 9/2008 | Lutnick et al. |
| 2009/0030741 A1 | 1/2009 | Veitch |
| 2009/0048878 A1 | 2/2009 | Metcalf |
| 2010/0023410 A1 | 1/2010 | Doan |
| 2011/0029335 A1 | 2/2011 | Lutnick et al. |
| 2012/0136682 A1 | 5/2012 | Harris |
| 2018/0285783 A1 | 10/2018 | Lutnick et al. |

FOREIGN PATENT DOCUMENTS

| | | |
|---|---|---|
| JP | 2002-74108 | 3/2002 |
| JP | 2002-149937 | 5/2002 |
| JP | 2002-279227 | 9/2002 |

OTHER PUBLICATIONS

International Preliminary Report on Patentability for International Application No. PCT/US08/53309, dated Sep. 8, 2009 (9 pages).

Australian Exam Report for Application No. 2008200781, dated Jun. 25, 2009 (2 pages).

Bob Tedeschi, Ordering Takeout Online: A Dot-Com Idea Returns for a Second Try, New York Times, published: Jun. 13, 2005.

U.S. Appl. No. 12/906,643, filed Oct. 18, 2010, Inventors: Howard W. Lutnick, et al., entitled "Receiving a Request to Reserve a Service" (45 pages).

Australian Notice of Acceptance for Application No. 2008200781, dated Nov. 9, 2010 (3 pages).

Japanese Office Action for Application No. 2008-50963 with English translation, dated Feb. 8, 2011 (8 pages).

Japanese Office Action for Application No. 2012-156384 dated Feb. 12, 2014 (5 pages).

Canadian Exam Report for Application No. 2,620,979 dated Oct. 19, 2016, 6 pages.

Canadian Exam Report for Application No. 2,620,979 dated Sep. 22, 2015, 4 pages.

Canadian Exam Report for Application No. 2,620,979 dated Dec. 18, 2014, 3 pages.

Canadian Exam Report for Application No. 2,620,979 dated Jul. 21, 2017, 5 pages.

Canadian Exam Report for Application No. 2,620,979 dated Jun. 26, 2018, 5 pages.

| [Date] | Table 1 (seats 2) | Table 2 (seats 2) | Table 3 (seats 4) | Table 4 (seats 4) | Virtual 1 | Virtual 2 |
|---|---|---|---|---|---|---|
| 11am | Reserved | Open | Open | Open | Open | Open |
| 12pm | Reserved | Reserved | Reserved | Reserved | Not Avail | Not Avail |
| 1pm | Reserved | Reserved | Reserved | Open | Not Avail | Not Avail |
| 2pm | Open | Open | Open | Reserved | Open | Open |
| 3pm | Open | Open | Open | Open | Open | Reserved |
| 4pm | Open | Open | Open | Open | Reserved | Reserved |
| 5pm | Open | Open | Reserved | Reserved | Open | Not Avail |
| 6pm | Reserved | Reserved | Reserved | Reserved | Reserved | Not Avail |
| 7pm | Reserved | Reserved | Reserved | Reserved | Reserved | Not Avail |
| 8pm | Reserved | Reserved | Reserved | Reserved | Reserved | Reserved |
| 9pm | Reserved | Reserved | Reserved | Reserved | Reserved | Reserved |
| 10pm | Reserved | Reserved | Reserved | Reserved | Reserved | Open |

Fig. 2

RECEIVING A REQUEST TO RESERVE A SERVICE

CROSS-REFERENCE TO RELATED APPLICATIONS

This application is a continuation of U.S. patent application Ser. No. 12/906,643 filed on Oct. 18, 2010 which is a continuation of U.S. patent application Ser. No. 11/681,663 filed on Mar. 2, 2007 (now U.S. Pat. No. 7,818,191 issued on Oct. 19, 2010), each of which is hereby incorporated by reference herein in its entirety.

BRIEF DESCRIPTION OF THE FIGURES

FIG. 2 illustrates one embodiment of a schedule.

DETAILED DESCRIPTION

Figure 1:
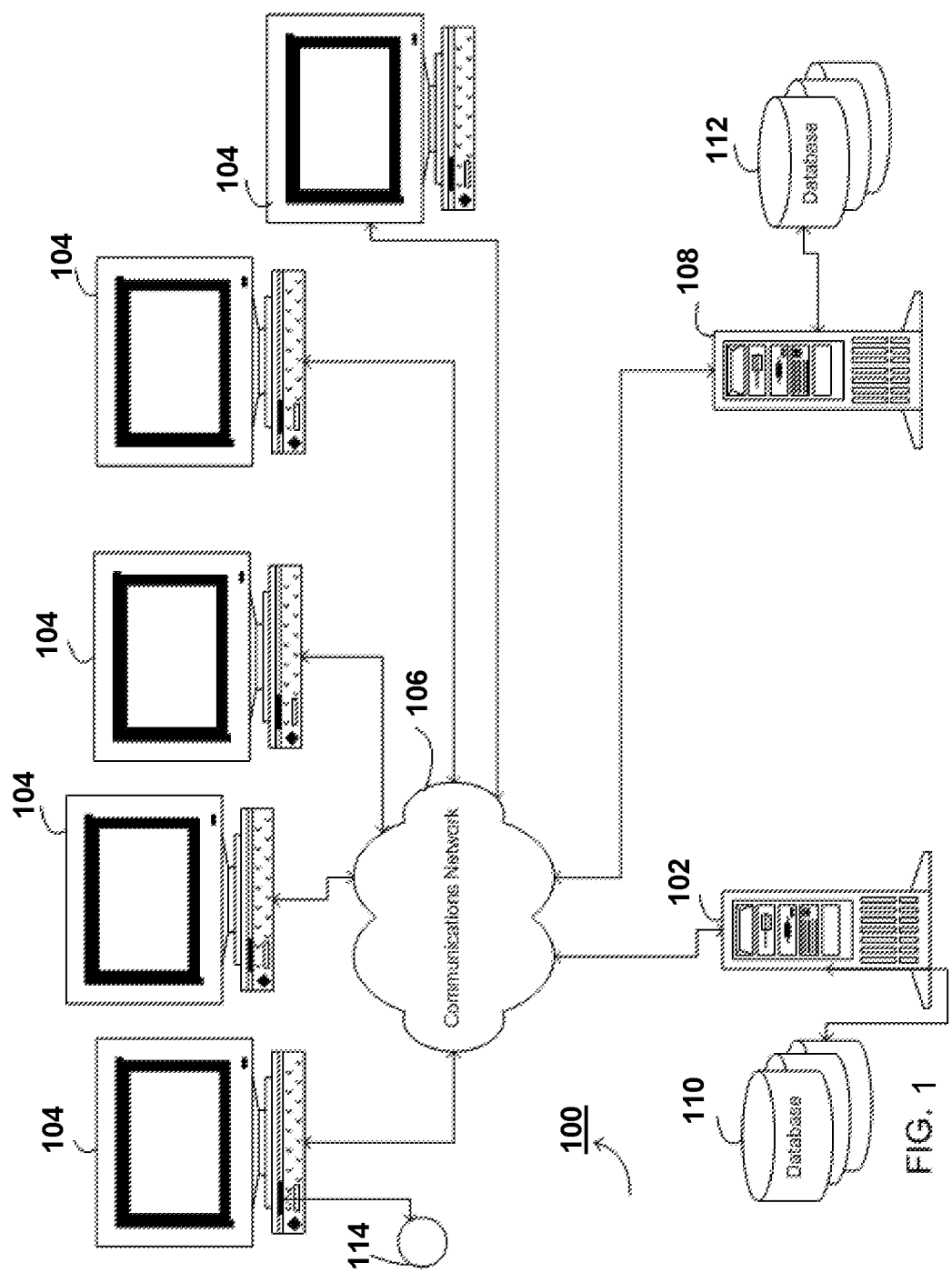
FIG. 1 illustrates a system according to at least one embodiment of the systems disclosed herein.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining III. Forms of Sentences Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Overview of Various Embodiments

Embodiments include systems and methods that permit the reservation of various dining services provided by a restaurant via interconnected computer networks. The term "customer" should be interpreted broadly to include any user of the system, such as an actual patron and an agent ordering on behalf of another entity.

Some dining services may include reserving a seat at a table in a restaurant, providing consumable menu items to customers dining in the restaurant's facilities, delivering menu-items to a customer's location, or preparing menu items that are available for pick-up at the restaurant's location. Each of these dining options may be reserved for a particular date and a particular time of day.

a. Hardware of the System

Referring to FIG. 1, a system 100, according to at least one embodiment of the systems disclosed herein, includes at least one computing device, such as a remote computer 102 (e.g., a server computer), a client computer 104, or a combination thereof. The term remote in this context merely means that the remote computer 102 and at least one of the client computers 104 are separate devices. Thus, the devices may be remote even if they are located within the same room. In at least one embodiment, the system includes at least one remote computer 102 that is connected over a communication network 106 to one or a plurality of client computers 104. One or more of the client computers 104 may be connected to the remote computer 102 through a firewall. In another embodiment, at least one remote computer 102 is connected over a communication network 106 to at least one other remote computer 108.

The system 100 may be implemented over any type of communications network 106, such as a local area network (LAN), a wide area network (WAN), the Internet, a telephone network (POTS), a wireless network, including cellular, WiFi, and WiMax networks, or a combination of wired and/or wireless networks. In certain instances, the communications network 106 may be independent of the Internet or limited with respect to the type of the information transmitted over the Internet, such as to information that poses little or no security risk if misappropriated or that has been encrypted.

In the networked embodiment, client computers 104 are preferably configured or otherwise capable of transmitting and/or receiving communications to and/or from the remote computer(s) 102, 108. The remote computers 102, 108 may similarly be configured or otherwise capable of transmitting and/or receiving communications between themselves. This may be accomplished with a communication element, such as a modem, an Ethernet interface, a transmitter/receiver, etc., that enables communication with a similarly equipped remote computer 102,108 wirelessly, wired, or a combination thereof. It is understood that the relative functionality described herein may be provided by the remote computers 102, 108, by the client computers 104, or both, and is thus not limited to any particular one of the implementations discussed herein. In at least one embodiment, the client computers 104 will generally provide the front-end functionality and the remote computer 102, 108 will provide the back-end functionality.

The computing device, e.g., the client computers 104 and/or the remote computer 102, 108 generally include at least one processor, and a memory, such as ROM, RAM, FLASH, etc., including computer readable medium type memory, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 110, 112 for retrieving and/or storing the various types of data discussed herein, including identity verification data, such as an ID and password, biometric data, etc.

The client computers 104 may include, without limitation, a mobile phone, PDA, pocket PC, personal computer, as well as any special or other general purpose computing device. As such, the client computer 104 preferably includes a processor, a memory, a display, such as a CRT or an LCD monitor, for displaying information and/or graphics associated with the functionality provided by the system 100, and at least one input device, such as a mouse, a touch-sensitive pad, a pointer, a stylus, a trackball, a button or a plurality of buttons, e.g., alphanumeric, a scroll wheel, a touch-sensitive monitor, etc., or a combination thereof, for users to enter commands and/or information relevant to the system's functionality. With the general purpose type of client computer 104, such as the PC or PDA, users may access the functionality provided by the system 100 with a browser application or any other generic application, or with special purpose software designed specifically for accessing the functionality disclosed herein.

In at least one embodiment, the client computer 104 includes or is otherwise associated with at least one biometric sensor 114. The biometric sensor 114 is any device that is used to determine directly from the user at least one item of biometric data associated with a user, such as a fingerprint reader, an iris scanner, a retinal scanner, a vascular pattern reader, a facial recognition camera, etc. The biometric sensor 114 may be embodied in hardware, software, or a combination thereof. The biometric sensor 114 may further share resources with other components of the client computer 104, such as the processor, memory, a camera, a microphone, a speaker, etc. A single biometric sensor 114 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons.

The biometric data is generally obtained with the biometric sensor 114 and used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

b. Managing a Schedule of Actual and Virtual Tables

According to at least one embodiment of the methods and systems disclosed herein, a customer can reserve (e.g., in advance) various types of dining services provided by a restaurant. The reservations may include reserving a seat at a table in the restaurant for a particular date and time. The reservation also may include scheduling a time for the pick-up or delivery of consumable goods offered by the restaurant.

FIG. 2 illustrates, in one embodiment, a schedule 200 that can be used for scheduling the different types of reservations. In the embodiment of FIG. 2, the schedule 200 can track the availability of "actual tables", which represent the seating that is available in the restaurant's on-site dining area. The schedule 200 also can track the availability of "virtual tables," which represent a restaurant's availability to provide carry-out services. Although the embodiments described below discuss the use of virtual tables to manage a restaurant's carry-out services, a virtual table is equally applicable in the context of delivery services, or any dining services provided by the restaurant that extends beyond on-site dining. In some embodiments, such as that illustrated in FIG. 2, the schedule 200 treats a virtual table in the same manner as an actual table. Customers can make a reservation for a particular time and a particular date at a virtual table (as they can for an actual table). In some embodiments, the customers may place orders for consumable menu items at the same time that they make a reservation for a virtual table. In such instances, the restaurant may prepare the menu items in advance, so that they are available for pick-up at the reserved time.

In other embodiments, customers may not include an order for menu items with their reservations. Instead, they may arrive at the restaurant during the reservation date and time, and they may order items off the menu while at the restaurant. In such instances, the restaurant prepares the menu items in the order of receipt.

In the embodiment of FIG. 2, schedule 200 depicts the restaurant as having four physical tables available for on-site dining. These four physical tables are represented on the schedule 200 as columns 202-208 (e.g., Tables 1-4). Each of the table columns 202-208 is divided into increments of time 210-232 (e.g., hourly increments) for a particular date 234 (e.g., Monday). These increments of time will be referred to, henceforth, as "time slots" 210-232, which can be updated (e.g., in real-time) to reflect their status (e.g., reserved, open, not available).

Furthermore, FIG. 2 also depicts the restaurant as having two virtual tables (which are represented in FIG. 2 as columns 236, 238), which are available for servicing the restaurant's carry-out dining services.

The integration of virtual tables into the schedule 200 can help a restaurant manage its carry-out service. In some embodiments, a restaurant may customize the quantity of virtual tables made available in accordance to business needs. For example, a restaurant may experience a high volume of on-site diners during the lunch-time rush hour. As such, the restaurant may want to eliminate carry-out dining services from the schedule 200 during this busy time, so that it can concentrate on servicing the on-site customers. To do so, the restaurant may change the status of its virtual tables to "unavailable" during the busy lunch hour.

In another embodiment, a restaurant may want to reduce, but not eliminate, its carry-out dining services for a period of time. In this embodiment, the restaurant may change the status of some of the virtual tables to "unavailable", but leave the status of other virtual tables as "available".

In another embodiment, a restaurant may want to increase its carry-out dining services during the periods of time when on-site dining experience a lull. For example, a restaurant may experience a low volume of on-site dining customers during the late evening hours, while simultaneously experience a surge in carry-out requests. As such, in one embodiment, the restaurant may add one or more virtual tables to the schedule 200 in order to service the increased number of carry-out requests. In another embodiment, the restaurant converts one or more of the actual tables on the schedule 100 into virtual tables in order to accommodate the shift in business needs.

c. Automated Managing of the Schedule

The embodiments described above provide examples of a restaurant managing, sua sponte, a schedule 200 in accordance to its business needs. However, in at least one embodiment, the schedule 200 may be structured or programmed to automatically adjust the ratio of actual tables to virtual tables in accordance to various rules and threshold requirements.

In some situations, the restaurant may provide a set of rules, which determine the quantity of virtual tables made available on the schedule 200. One example of a rule may be a threshold that measures the on-site dining capacity of the restaurant. For instance, a restaurant may decide that it does not wish to provide carry-out services whenever eighty-percent of the on-site dining facilities have been reserved. In this instance, as soon as eighty-percent of the on-site dining facilities have been reserved for a particular time-slot, then the status of the virtual tables associated with that time-slot will be changed to "unavailable."

In one embodiment, the quantity of actual tables may differ for various days of the week. For example, in one embodiment, the rule may structure the schedule 200 have more on-site tables (and less virtual tables) available on the weekends than on the weekdays. In another embodiment, the quantity of actual table may differ for various times of the day. For example, in another embodiment, the rule may structure the schedule 200 to have more on-site tables (and less virtual tables) available during the lunch-time and dinner-time rush hours.

In another embodiment, a sliding-scale relationship may exist between the actual tables and the virtual tables. In this embodiment, each time a reservation is made either for an actual table or a virtual table, the schedule automatically adjusts the status of the remaining actual and virtual tables.

d. Generating a Restaurant Profile

In some embodiments, a customer who desires to make a reservation for a dining service at a restaurant will search through a database of restaurant profiles. The restaurant profiles may include, among other things, a description of the restaurant, a menu of the consumable items offered by the restaurant, a price list associated with each consumable item, an evaluation of the restaurant by former customers, and a schedule (which may be updated in real-time) that depicts the availability of the actual tables and virtual tables.

In order to generate a restaurant profile, a restaurant, in some embodiments, may submit information, via a network, to a server that houses the reservation system. Some examples of preliminary information may include the type of cuisine served by the restaurant, the prices of menu items, acceptable forms of payment, the restaurant's contact information and address, the quantity of actual tables on the on-site dining premises. The restaurant also can submit a menu, which contains a list of consumable goods offered by the restaurant. The menu also may include a description of the consumable goods offered and the corresponding prices for each consumable good. In addition, a restaurant can submit a reservation schedule that depicts the quantity of actual tables and the quantity of virtual tables that are available for each time slot. In some embodiments, the restaurant can add multi-media elements (e.g., pictures, videos, sound clips, web blogs, promotions, etc.) to the restaurant profile.

After receiving and confirming the information, the reservation system generates a restaurant profile, which stores the individualized data information (e.g., reservation schedule, menu of food items, price list) for each participating restaurant.

In one embodiment, the profile updates automatically (e.g., in real-time) whenever the restaurant modifies the contents of its restaurant profile (e.g., removes a menu item, removes a virtual table). In another embodiment, the restaurant may log into the reservation system and modify the contents of its restaurant profile in order to update the profile with recent changes.

The generated profile can be saved into a database. In some embodiments, the profiles may be categorized into searchable categories (e.g., type of cuisine, location of the restaurant, price ranges). Thus, a potential customer may search these categories in order to find a particular restaurant from which to place an order request. For example, a customer may search the database for Japanese restaurants with entrees costing between 30-50.

In some embodiments, the location of a restaurant is mapped in relation to a customer's address, so that a customer may search for a restaurant located within a radial-distance (e.g., 5 miles) from the customer's location.

e. Requesting a Reservation

After a customer has selected a restaurant from the database, the reservation system may receive a request to reserve submitted by the customer. In the request, the customer may indicate, among other things, the restaurant at which she desires to obtain dining services and the type of dining service desired (e.g., on-site dining, carry-out services, delivery services, etc.).

In the request, the customer also may indicate the type of table desired (e.g., actual table or a virtual table), as well as the particular date and time from which she wishes to make the reservation. In some embodiments, the customer does not indicate the type of table, since the system automatically corresponds the type of dining service requested with the type of table.

In some embodiments, the customer can view a restaurant's schedule in order to know (e.g., in advance of submitting a request to reserve) which time slots are available. In other embodiments, the customer do not see a restaurant's schedule; instead, the system presents the customer with the available times and dates from which the customer may select.

After the customer submits a request to reserve a dining service for a particular time and date, the reservation may confirm whether the requested time and date are available for the restaurant's schedule. The system may send a message to the customer either confirming or denying the requested reservation time.

If the reservation determines that the requested time and date are not available for reservation, then in some embodiments, the customer may modify the original request to reserve and submit a new request. This new request may include: a different restaurant, a different time slot, and/or a different date. In other embodiments, the system can permit customers to bid for a particular reservation time. This bidding process is detailed below.

However, if a customer successfully secures a reservation for a virtual table, then the system may prompt the customer to submit a menu order with that reservation. A menu order may include, among other things, items from the menu that the customer wishes to order, the quantity of each menu item, and any special instructions for the preparation of the menu items (e.g., low-sodium, salad dressing on the side, medium-rare cooking).

After the customer submits (and the system receives) the menu order, the system calculates the total cost of the items. The customer may pay for the total amount using any number of payment methods (e.g., on-line payment through the system via a credit card, paying by any monetary means upon picking up the menu items.)

The system can forward the selected menu items to the restaurant, so that the restaurant can prepare the menu items (e.g., in advance) so that they are available for pick-up by the customer at the reserved time and date.

f. Bidding Function

In some embodiments, a reservation made by a customer may remain unconfirmed for a term, or period of time. For example, the reservation may remain confirmed (and thus subject to bidding) until 24-hours before the reserved timeslot. During the term, one or more other customers interested in the same reservation time may participate in an auction for the reservation time.

In one embodiment, the system may contact a customer with the unconfirmed reservation to inform the customer that another party wishes to bid for the same time slot. The system may indicate a location and time in which the bidding processes takes place. Both customers may log into the system during the prescribed time frame and bid for the time slot.

In one embodiment, a website can solicit bids from interested parties. At the expiration of the term, the system can compare all of the submitted bids to determine which customer submitted the bid with the highest amount. In this embodiment, the customer who submitted the bid with the highest amount is awarded the reservation time, and the bid amount is charged as a reservation fee.

In another embodiment, interested parties e-mail their bids to the reservation system. The system may alert a customer if a previously submitted bid has been superseded by another bid. In response, the customer may submit a counter-bid in an amount that is greater than the other bids. At the expiration of the term, the system awards the reservation time to the bidder who submitted the bid with the highest amount.

In some embodiments, a customer may opt to pay a premium fee (e.g., generally of a large amount) in order to secure a particular reservation time. In this embodiment, the premium fee may represent a reservation fee that is paid in advance in order to prevent anyone else from bidding for the reservation time. For example, a customer may wish to take an important client to a popular restaurant in town. As such, the customer places a premium on having a guaranteed reservation, and as such, the customer may be willing to pay the premium fee to ensure that the reservation time is guaranteed.

In other embodiments, the system may not charge a customer with a reservation fee in the event that no other parties bid for the reserved time slot. Conversely, the customer may risk having to pay a reservation fee that is higher than the premium amount, in the event that the bidding process escalates to a high amount.

In some embodiments, the system also may participate in a reverse bidding process, where a customer may indicate a desire to dine at a particular date and time. The customer may have no preference as to which restaurant, but she may specify the type of cuisines or price ranges. Various restaurants may compete for the business by offering the customer promotions or discounts, or any other offers for attracting the business.

g. Additional Embodiments

A method comprising:
receiving a request to reserve a service that is provided by a restaurant, in which the request to reserve is for a particular time and a particular date and the service comprises at least one of: (i) preparing a consumable good that is consumed at the restaurant's location; (ii) preparing a consumable good that is received at the restaurant's location; or (iii) preparing a consumable good that is delivered to a location external to the restaurant's location; comparing the particular time requested with a schedule associated with the restaurant, in which the schedule comprises a list of times that are available for reservation; determining an availability of the request to reserve; outputting an indicia that the request to reserve the service has been accepted or denied.

The method of paragraph [00118] further comprises: receiving information associated with the restaurant, in which the information comprises: (i) a schedule indicating the restaurant's ability to provide at least one service for a plurality of periods of time; and (ii) a description of a consumable good that is offered by the restaurant; (iii) a price associated with the consumable good; and (iv) an evaluation of the restaurant, in which the evaluation comprises at least one opinion of a previous customer.

The method of paragraph [00118] further comprises: confirming that the particular time requested is available; outputting an indicia that the request to reserve the service has been accepted.

The method of paragraph [00120] further comprises: receiving a request for at least one consumable good, in which the at least one consumable good is offered by the restaurant; receiving a quantity of the at least one consumable good; and calculating a price of the at least one consumable good, in which the price comprises an amount that a customer pays in exchange for the consumable good requested.

The method of paragraph [00118] further comprises: determining that the particular time requested is unavailable; outputting an indicia that the request to reserve the service has been denied.

The method of paragraph [00122] further comprises: receiving a modified request, in which the modified request modifies at least one of: the service requested, the particular time requested or the date requested.

The method of paragraph [00122] further comprises: determining that the particular time is available for bidding, in which the bidding is available during a period of time; receiving a bid submitted for the particular time; comparing the bid with at least one other bid; outputting an indicia that grants the request to reserve to a highest bidder, in which the highest bidder submitted the bid with an amount that is greater than an amount associated with the at least one other bid.

The method of paragraph [00122] further comprises: receiving a first bid for the particular time, in which the particular time was previously determined as unavailable and the first bid was placed by the first customer; outputting an indicia of the first bid to a second customer, in which the second customer previously reserved the particular time; determining that the first bid is greater than the second bid; and outputting an indicia to the first customer, in which the indicia indicates that the request to reserve the service for the particular time requested has been approved.

The method of paragraph [00122] further comprises: receiving a first bid for the particular time, in which the particular time was previously determined as unavailable and the first bid was placed by the first customer; outputting an indicia of the first bid to a second customer, in which the second customer previously reserved the particular time; determining that the second bid is greater than the first bid; and outputting an indicia to the first customer, in which the indicia indicates that the request to reserve the service for the particular time requested has been denied.

The method of paragraph [00118] further comprises: receiving a premium fee associated with the particular time requested, in which the premium fee prevents bidding for the particular time; determining that the particular time is unavailable for bidding; rejecting a bid submitted for the particular time.

The method of paragraph [00118] further comprises: updating the schedule with the request to reserve the service.

The method of paragraph [00118], in which updating the schedule further comprises: determining a quantity of on-site dining requests, in which the on-site dining request comprises the request to reserve the service for preparing a consumable good that is consumed at the restaurant's location; determining that the quantity of on-site dining request has exceeded a threshold; decreasing the number of available carry-out dining requests on the schedule, in which the carry-out dining request comprises the request to reserve the service for preparing a consumable good that is received that the restaurant's location.

The method of paragraph [00118], in which updating the schedule further comprises: determining a quantity of on-site dining requests, in which the on-site dining request comprises the request to reserve the service for preparing a consumable good that is consumed at the restaurant's location; determining a quantity of carry-out dining requests, in which the carry-out dining comprises the request to reserve the service for preparing a consumable good that is received that the restaurant's location; calculating a ratio between the quantity of on-site dining requests to the quantity of carry-out dining requests; determining that the ratio has exceeded a threshold; decreasing the number of available carry-out dining requests on the schedule.

A storage medium containing machine instructions readable by a computer system that includes a data store to configure the computer system to perform the method of paragraph [00118].

The computer system of paragraph [00131] configured to perform the method of paragraph [00119].

The computer system of paragraph [00131] configured to perform the method of paragraph [00120].

The computer system of paragraph [00133] configured to perform the method of paragraph [00121].

The computer system of paragraph [00131] configured to perform the method of paragraph [00122].

The computer system of paragraph [00135] configured to perform the method of paragraph [00123].

The computer system of paragraph [00135] configured to perform the method of paragraph [00124].

The computer system of paragraph [00131] configured to perform the method of paragraph [00127].

The computer system of paragraph [00131] configured to perform the method of paragraph [00128].

The computer system of paragraph [00131] configured to perform the method of paragraph [00129].

The computer system of paragraph [00131] configured to perform the method of paragraph [00130].

An apparatus comprising: a storage device; a processor connected to the storage device; the storage device storing a program for controlling the processor; and the processor operative with the program to: receiving a request to reserve a service that is provided by a restaurant, in which the request to reserve is for a particular time and a particular date and the service comprises at least one of: (i) preparing a consumable good that is consumed at the restaurant's location; (ii) preparing a consumable good that is received at the restaurant's location; or (iii) preparing a consumable good that is delivered to a location external to the restaurant's location; comparing the particular time requested with a schedule associated with the restaurant, in which the schedule comprises a list of times that are available for reservation; determining an availability of the request to reserve; outputting an indicia that the request to reserve the service has been accepted or denied.

What is claimed:

1. A method of operating an electronic reservation system configured to provide reservation options for a restaurant over a network with graphical user interfaces of computing devices, said method comprising:
    detecting a plurality of user inputs from a computing device associated with the electronic reservation system, in which each user input indicates data representing a bid for a service that is provided by the restaurant, in which the service is provided at a specific date and a specific time, in which each bid comprises a bid amount, and in which each bid is received before expiration of a bidding period;
    in response to detecting each bid, computing, via the computing device of the electronic reservation system, that:
        based on a schedule the restaurant is capable of providing the service on the specific data and the specific time;
        a first bid comprises a first bid amount that is greater than a second bid submitted by a second bid;
    detecting a user input from the computing device associated with the electronic reservation system, in which the user input indicates data representing a premium fee that is submitted with the second bid;
    in response to detecting the premium fee, determining, via the computing device of the electronic reservation system, that the second bid is granted the service at the specific date and the specific time;
    configuring, via the computing device of the electronic reservation system, to block out the specific date and the specific time for the service; and
    communicate, via the computing device of the electronic reservation system, commands to a graphical user interface of the computing device to block out the specific date and the specific time for the service.

2. The method of claim 1, in which the service provided by the restaurant comprises at least one of:
    preparing a consumable good that is consumed at the restaurant's location;
    preparing a consumable good that is received at the restaurant's location; or
    preparing a consumable good that is delivered to a location external to the restaurant's location.

3. The method of claim 1, in which the schedule indicates the restaurant's ability to provide at least one service for a plurality of periods of time.

4. The method of claim 1, in which the schedule comprises a ratio of actual tables to virtual tables,
    in which the actual table corresponds to a service of preparing a consumable good that is consumed at the restaurant's location, and
    in which the virtual table corresponds to a service of preparing a consumable good that is received at the restaurant's location; or
    preparing a consumable good that is delivered to a location external to the restaurant's location.

5. The method of claim 4, in which the ratio is adjustable.

6. The method of claim 1 further comprising:
    receiving a request to adjust the schedule in accordance to the restaurant's needs during various times of a day.

7. The method of claim 1, in which the first amount and the second amount represent an amount that is charged for reserving the service.

8. An article of manufacture comprising:
    a computer-readable medium that is non-transitory, in which the computer-readable medium stores instructions for operating an electronic reservation system configured to provide reservation options for a restaurant over a network with computing devices, the instructions which, when executed by a computing device of an electronic reservation system, direct the computing device of the electronic reservation system to:
    detect a plurality of user inputs a computing device of an electronic reservation system, in which each user input, from a computing device, indicates a bid for a service that is provided by the restaurant, in which the service is provided at a specific date and a specific time, in which each bid comprises a bid amount, and in which each bid is received before expiration of a bidding period;
    in response to detecting each bid, compute, via the computing device of the electronic reservation system, that:
        based on a schedule the restaurant is capable of providing the service on the specific data and the specific time;

a first bid comprises a first bid amount that is greater than a second bid submitted by a second bid;

detect a user input from the computing device associated with the electronic reservation system, in which the user input indicates a premium fee that is submitted with the second bid;

in response to detecting the premium fee, determine, via the computing device of the electronic reservation system, that the second bid is granted the service at the specific date and the specific time;

configure, via computing device of the electronic reservation system, to block out the specific date and the specific time for the service; and communicate, via the computing device of the electronic reservation system, commands to a graphical user interface of the computing device to block out the specific date and the specific time for the service.

9. The article of manufacture of claim 8, in which the service provided by the restaurant comprises at least one of:
preparing a consumable good that is consumed at the restaurant's location;
preparing a consumable good that is received at the restaurant's location; or
preparing a consumable good that is delivered to a location external to the restaurant's location.

10. The article of manufacture of claim 8, in which the schedule indicates the restaurant's ability to provide at least one service for a plurality of periods of time.

11. The article of manufacture of claim 8, in which the schedule comprises a ratio of actual tables to virtual tables,
in which the actual table corresponds to a service of preparing a consumable good that is consumed at the restaurant's location, and
in which the virtual table corresponds to a service of preparing a consumable good that is received at the restaurant's location; or
preparing a consumable good that is delivered to a location external to the restaurant's location.

12. The article of manufacture of claim 8, in which the ratio is adjustable.

13. The article of manufacture of claim 8, in which the computer-readable medium stores instructions which, when executed by a processor, direct the processor to:
receive a request to adjust the schedule in accordance to the restaurant's needs during various times of a day.

14. The article of manufacture of claim 8, in which the first amount and the second amount represent an amount that is charged for reserving the service.

15. An apparatus for operating an electronic reservation system configured to provide reservation options for a restaurant over a network of computing devices, the apparatus comprising:
at least one processor of a computing device of an electronic reservation system; and
at least one memory device electronically coupled to the at least one processor of a computing device of the electronic reservation system, wherein the at least one memory device stores instructions which, when executed by the at least one processor of the computing device of the electronic reservation system, direct the at least one processor of the computing device of the electronic reservation system to:

detect a plurality of user inputs from a computing device associated with the electronic reservation system, in which each user input, from a computing device, indicates data representing a bid for a service that is provided by the restaurant, in which the service is provided at a specific date and a specific time, in which each bid comprises a bid amount, and in which each bid is received before expiration of a bidding period;

in response to detecting each bid, compute, via the computing device of the electronic reservation system, that:
based on a schedule the restaurant is capable of providing the service on the specific data and the specific time;
a first bid comprises a first bid amount that is greater than a second bid submitted by a second bid;

detect a user input from the computing device associated with the electronic reservation system, in which the user input indicates a premium fee that is submitted with the second bid;

in response to detecting the premium fee, determine, via the computing device of the electronic reservation system, that the second bid is granted the service at the specific date and the specific time;

configure, via the computing device of the electronic reservation system, to block out the specific date and the specific time for the service; and communicate, via the computing device of the electronic reservation system, commands to a graphical user interface of the computing device to block out the specific date and the specific time for the service.

16. The apparatus of claim 15, in which the service provided by the restaurant comprises at least one of:
preparing a consumable good that is consumed at the restaurant's location;
preparing a consumable good that is received at the restaurant's location; or
preparing a consumable good that is delivered to a location external to the restaurant's location.

17. The apparatus of claim 15, in which the schedule indicates the restaurant's ability to provide at least one service for a plurality of periods of time.

18. The apparatus of claim 15, in which the schedule comprises a ratio of actual tables to virtual tables,
in which the actual table corresponds to a service of preparing a consumable good that is consumed at the restaurant's location, and
in which the virtual table corresponds to a service of preparing a consumable good that is received at the restaurant's location; or
preparing a consumable good that is delivered to a location external to the restaurant's location.

19. The apparatus of claim 15, in which the ratio is adjustable.

20. The apparatus of claim 15, in which the computer-readable medium stores instructions which, when executed by a processor, direct the processor to:
receive a request to adjust the schedule in accordance to the restaurant's needs during various times of a day.

* * * * *